US007385154B2

(12) United States Patent
Klug

(10) Patent No.: US 7,385,154 B2
(45) Date of Patent: Jun. 10, 2008

(54) CAM SWITCH WITH LOST MOTION LEVER ACTUATOR

(75) Inventor: Carl J. Klug, Rochester Hills, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 105 days.

(21) Appl. No.: 11/516,420

(22) Filed: Sep. 6, 2006

(65) Prior Publication Data

US 2007/0051605 A1 Mar. 8, 2007

Related U.S. Application Data

(60) Provisional application No. 60/714,412, filed on Sep. 6, 2005.

(51) Int. Cl.
*H01H 3/04* (2006.01)
*B60J 7/00* (2006.01)

(52) U.S. Cl. ...................... 200/574; 200/329; 200/335; 296/107.09; 296/108; 296/118

(58) Field of Classification Search ................ 200/335, 200/337, 52 R, 61.58 R, 329, 237, 61.62, 200/61.7, 573, 574; 296/108, 118, 107.01–9, 296/109, 107.11–19, 107.2
See application file for complete search history.

(56) References Cited

U.S. PATENT DOCUMENTS 3,291,929 A 12/1966 Wanlass
4,817,999 A 4/1989 Drew
4,917,415 A 4/1990 Wurl
5,301,987 A 4/1994 Tokarz et al.
5,413,390 A 5/1995 Filippi
5,755,467 A 5/1998 Dilluvio et al.
5,772,274 A 6/1998 Tokarz
5,903,119 A 5/1999 Laurain et al.
5,957,511 A 9/1999 Homann et al.
5,998,948 A 12/1999 Lange et al.
6,155,614 A 12/2000 Lange
6,419,296 B2 7/2002 Dintner et al.
6,629,719 B2 10/2003 Sims
6,695,385 B1 * 2/2004 Lange .................. 296/107.12
6,834,907 B2 12/2004 Dietl
6,843,522 B2 1/2005 Lange
(Continued)

*Primary Examiner*—Elvin Enad
*Assistant Examiner*—M. Fishman
(74) *Attorney, Agent, or Firm*—Brooks Kushman P.C.

(57) ABSTRACT

A cam switch assembly is actuated by movement of a member, such as a part of a convertible top that is pivoted about a first pivot axis toward and away from a surface that is fixed relative to the pivot. The cam switch comprises a holder for at least one switch that is attached to the member. A cam switch actuator having an arm is attached to the holder at a second pivot axis. The cam switch actuator opens and closes the switch as the cam switch actuator is pivoted relative to the holder about the second pivot axis. The arm has a first lost motion connection to the movable member in a first direction. The member has a second lost motion connection at the first pivot axis that is aligned with the first direction when the member is moved into engagement with the surface. The member is movable relative to the surface in a first direction and the arm is permitted to move relative to the surface without changing the angular orientation of the cam switch actuator relative to the holder.

8 Claims, 3 Drawing Sheets

U.S. PATENT DOCUMENTS

| | | | | |
|---|---|---|---|---|
| 6,863,334 | B2 * | 3/2005 | Dangl et al. | 296/107.09 |
| 7,265,308 | B2 * | 9/2007 | Endres et al. | 200/339 |
| 2003/0057728 | A1 | 3/2003 | Sims | |
| 2004/0189041 | A1 | 9/2004 | Lange | |
| 2004/0262943 | A1 | 12/2004 | Kubota et al. | |

* cited by examiner

CAM SWITCH WITH LOST MOTION LEVER ACTUATOR

CROSS-REFERENCE TO RELATED APPLICATIONS

This application claims the benefit of U.S. provisional application Ser. No. 60/714,412 filed Sep. 6, 2005.

BACKGROUND OF THE INVENTION

1. Field of the Invention

The present invention relates to a switch assembly for sensing the position of relatively pivoted members that accommodates limited non-pivoted movement of the members.

2. Background Art

It is well known to use switches to sense movement of articulated members. For example, linkages may be provided with switches that indicate the position of links relative to each other and supporting structures. Switches may comprise limit switches, reed switches, Hall Effect sensors, and the like. Signals from such switches are processed by control systems that may control linkage drive systems or coordinate movement of the linkage with other systems.

Examples of linkages that have switches may include convertible top stack linkages and retractable hard top systems but may also include a wide range of other types of linkages. Convertible top stack linkages are made up of a plurality of bows that are connected by links that are used to fold the convertible top between an extended position and a retracted position. Retractable hard tops have rigid panels that are linked together and may be moved between an extended position and a retracted position.

Switches on convertible tops and retractable hard tops may be used to sense the location of the top and provide signals to a controller. The controller may be used to start, stop and control movement of the top and also may be used to sequence operation of the top stack linkage with a power operated tonneau cover.

A pivot normally has only one degree of freedom in that it permits two parts of a linkage to pivot relative to each other. Linkages with only one degree of freedom may become misaligned relative to adjacent structures. If a linkage is misaligned it may not be able to move to a desired position. A pivot may be provided with an additional degree of freedom by various mechanisms that permit movement other than a pivoting movement. If a pivot is provided with an additional degree of freedom, a switch that senses the position of links connected at the pivot may provide an inaccurate representation of the sensed position of the links.

In the specific case of a rear bow of a convertible top, the five bow is normally at the bottom of the stack when the top is stored in the storage well. The top cover may become pinched between stacked bows that exert pressure on the top cover to compress it for storage. A lost motion connection can increase the freedom of the top to be better aligned with the storage well.

In addition, with a convertible top or retractable hard top, a lower rear edge of the top must be able to engage the vehicle at the belt line. A good fit should be formed where the lower rear edge of the top contacts the vehicle body. Due to manufacturing variation and tolerance stack up, the rear most bow of a convertible top or rear edge of a retractable hard top may be out of alignment with the contact line on the vehicle body that they are intended to engage. If there is an offset in the position of the linkage and vehicle body contact line either side to side or as the relative height, a gap may be formed between the top and the vehicle body. To eliminate any such gap, a lost motion connection may be provided in the pivot that can provide an additional degree of freedom that allows the linkage to align itself with the vehicle body. A problem arises with such lost motion connections if the position of the pivoted links is monitored by a conventional switch arrangement.

There is a need for a switch that can cooperate with a pivot connection having a second degree of freedom that permits self-aligning or equalizing of the location of the pivoted links relative to adjacent structure without adversely impacting switch performance. Stated in other terms, there is a need for a switch assembly that provides accurate sensing of the location of pivoted links that have a lost motion connection. These needs and others are addressed by applicant's invention as summarized below.

SUMMARY OF THE INVENTION

According to one aspect of the present invention a cam switch assembly is provided that is actuated by movement of a member that it pivoted about a first pivot axis toward and away from a surface that is fixed relative to the pivot axis. The cam switch comprises a holder for holding at least one switch that is attached to the pivoted member. A cam switch actuator having an arm is attached to the holder at a second pivot axis. The cam switch actuator opens and closes the switch as the actuator is pivoted relative to the holder about the second pivot axis. The arm has a first lost motion connection to the moveable member in a first direction. The pivoted member has a second lost motion connection at a first pivot axis that is aligned with the first direction. The member is moveable relative to the surface in a first direction so that the arm is permitted to move relative to the surface without changing the angular orientation of the cam switch actuator relative to the holder.

According to other aspects of the present invention, the member that actuates the cam switch assembly may be a bow of a convertible top or may be a panel of a retractable hardtop.

According to another aspect of the invention, the holder may be provided with two switches that are actuated by movement of the member when the member is in a first position and in a second position.

According to other further aspects of the present invention, the first lost motion connection may comprise a slot formed in the arm of the cam switch. The second lost motion connection may be a slot formed in the member that receives a pin that is supported on a bracket of a rear rail. The first lost motion switch, or slot, formed in the arm of the cam switch is elongated in the first direction and the slot formed in the member is also elongated in a second direction. The slot formed in the arm of the cam switch rotates with the arm and the slot formed in the member are aligned when the member is moved into engagement with the surface.

These and other aspects of the present invention will be better understood in view of the attached drawings and following detailed description of the illustrated embodiment.

DETAILED DESCRIPTION OF THE PREFERRED EMBODIMENT(S)

Figure 1:
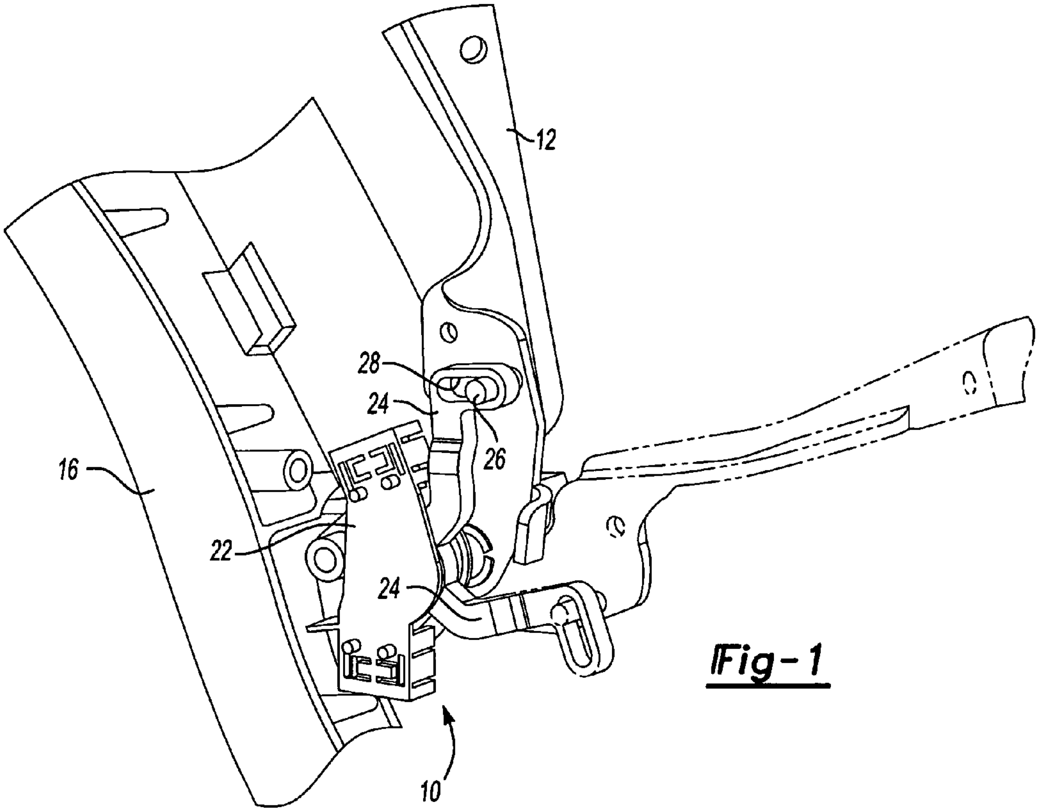
FIG. 1 is a fragmentary perspective view of a cam switch assembly made according to the present invention shown installed at the pivot point of a five bow of a convertible top.
Figure 3:
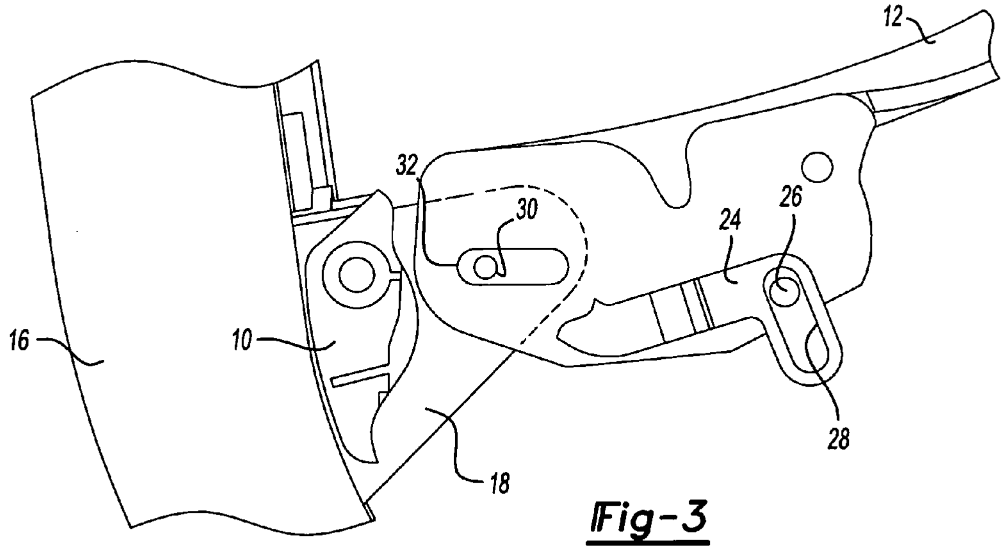
FIG. 3 is a fragmentary side elevation view of a convertible top linkage having a cam switch assembly in an extended position.
Figure 2:
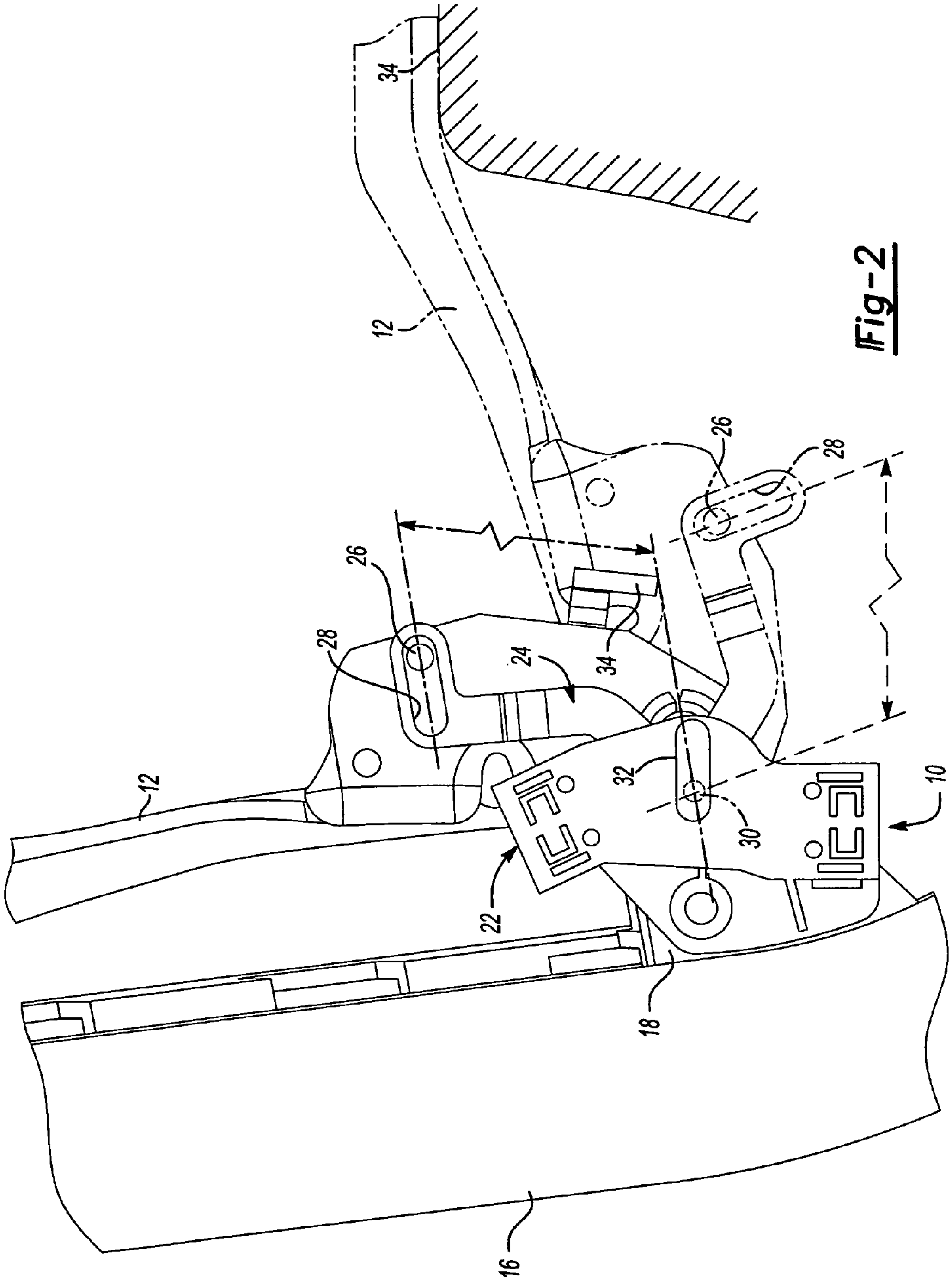
FIG. 2 is a fragmentary side elevation view of the five bow linkage having the cam switch assembly of the present invention attached at the five bow pivot.

Referring to FIGS. 1-3, a switch assembly 10 made according to the present invention is illustrated as it may be installed on a bow 12 of a convertible top. The bow 12 is the rear most bow of the convertible top stack mechanism that is generally referred to as the five bow in a convertible top having five bows. The bow 12 is pivotably connected to a rear rail 16. The rear rail 16 has a bracket 18, or flange, to which the bow 12 is pivoted.

The switch assembly 10 has a housing 22 onto which a lever arm cam 24 is pivotally secured, as will be more fully described with reference to FIGS. 4-6 below. A pin 26 is provided on the bow 12 that is received in a slot 28 formed in the lever arm cam 24. A pin 30 on the bracket 18 is received in a slot 32 formed in the bow 12. A surface 34 of the vehicle is engaged by the bow 12 when it is moved to the lowered, body engaging position of the bow 12.

Figure 4:
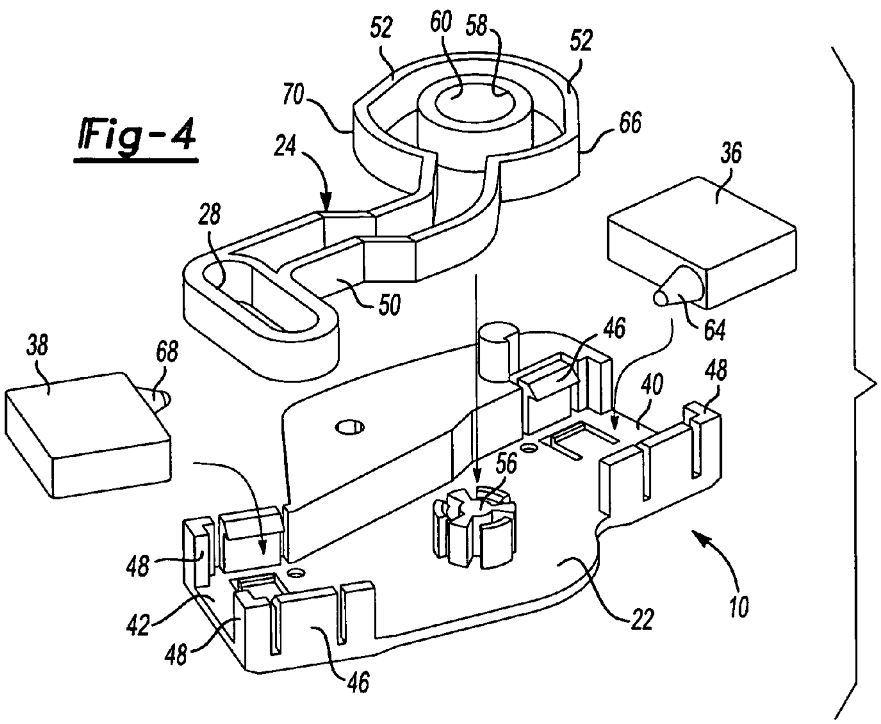
FIG. 4 is an exploded perspective view of the cam switch assembly of the present invention.
Figure 5:
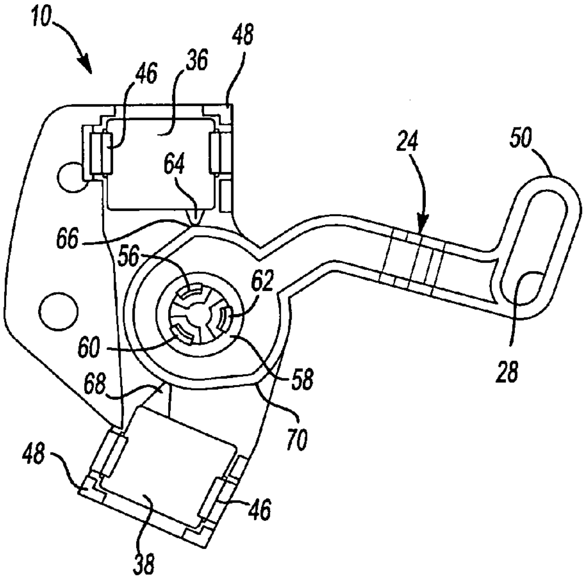
FIG. 5 is a side elevation view of the cam switch assembly in a raised position.
Figure 6:
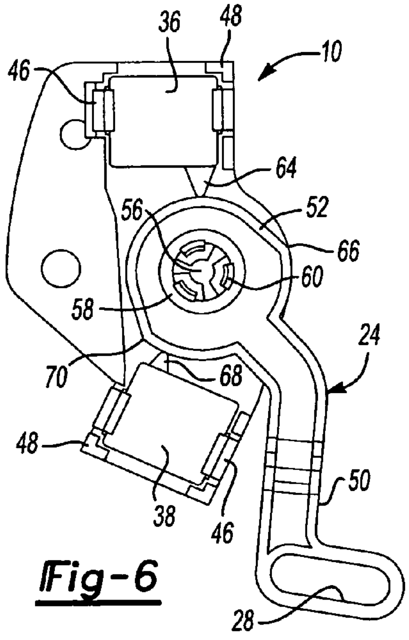
FIG. 6 is a side elevation view of the cam switch assembly in a lowered position.

Referring to FIGS. 4-6, the switch assembly 10 is shown in greater detail. The switch assembly 10 includes the housing 22 and the lever arm cam 24. A first limit switch 36 and second limit switch 38 are received by a first switch holder 40 and a second switch holder 42, respectively. The first and second switch holders 40, 42 each have two resilient locking tabs 46 and a plurality of locating flanges 48 that engage and retain a first and second limit switches 36 and 38 in the housing 22.

The lever arm cam 24 has an arm portion 50 and a cam portion 52. The arm portion 50 extends from the cam portion 52 to a pivotal attachment point on the bow 12. The pivotal attachment point on the bow 12 is formed by the pin 26 that is received in the slot 28. The cam portion 52 is pivotally secured to the switch assembly 10 by a molded hub 56 that is molded into the housing 22 and a tubular receptacle 58 that is formed in the cam portion 52 of the lever arm cam 24. A hole 60 is defined by the tubular receptacle 58 for receiving the molded hub 56. In the illustrated embodiment, the molded hub 56 has a central ribbed pin portion 61 and three flexible fingers 62.

The first limit switch 36 has a first switch actuator 64 that is actuated by a first lobe 66 formed on the cam portion 52 of the lever arm cam 24. A second switch actuator 68 actuates the second limit switch 38 when the second lobe 72 formed on the cam portion 52 of the lever arm cam 24 is pivoted relative to the second limit switch 38.

Referring to FIG. 5, the switch assembly 10 is shown in a position corresponding to its position when the bow 12 is in a raised position. The arm portion 50 is rotated to a position in which the first lobe 62 is in contact with the first switch actuator 64. In this position the first limit switch 36 is actuated and a control signal may be provided to a control system (not shown). The first limit switch 36 is retained on the housing 22 by the resilient locking tabs 46 and locating flanges 48.

Referring to FIG. 6, the switch assembly 10 is shown in a position corresponding to its position when the bow 12 is in a lowered position. The second switch actuator 68 is shown in its actuated or depressed position because it is contact with the second lobe 70 of the cam portion 52 of the lever arm cam 24. The second limit switch 38 is retained by the locking tabs 46 and locating flanges 48. The arm portion 50 of the lever arm cam 24 is rotated clockwise relative to the position shown in FIG. 5 so that the second lobe 70 actuates the second switch actuator 68.

In FIGS. 5 and 6, the lever arm cam 24 is rotated about the molded hub 56 that is received in the hole 60 defined by the tubular receptacle 58 of the lever arm cam 24.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cam switch assembly that is actuated by movement of a member that is pivoted about a first pivot axis toward and away from a surface that is fixed relative to the pivot, the cam switch comprising:

a holder for at least one switch, the holder being attached to the member;

a cam switch actuator having an arm, the cam switch actuator being attached to the holder at a second pivot axis, the cam switch actuator opening and closing the switch as the cam switch actuator is pivoted relative to the holder about the second pivot axis, the arm having a first lost motion connection to the movable member in a first direction;

the member having a second lost motion connection at the first pivot axis that is aligned with the first direction when the member is moved into engagement with the surface, wherein the member is moveable relative to the surface in the first direction and wherein the arm is permitted to move relative to the surface without changing the angular orientation of the cam switch actuator relative to the holder.

2. The cam switch assembly of claim 1 wherein the member is a bow of a convertible top.

3. The cam switch assembly of claim 1 wherein the member is a panel of a retractable hardtop.

4. The cam switch assembly of claim 1 wherein the holder is provided with two switches that are actuated by movement of the member when the member is in a first position and a second position.

5. The cam switch assembly of claim 1 wherein the first lost motion connection is a slot formed in the arm of the cam switch.

6. The cam switch assembly of claim 1 wherein the second lost motion connection is a slot formed in the member that receives a pin that is supported on a bracket of a rear rail.

7. The cam switch assembly of claim 6 wherein the first lost motion connection is a slot formed in an arm of the cam switch, wherein the slot formed in the arm of the cam switch is elongated in a first direction, and wherein the slot formed in the member is also elongated in a second direction.

8. The cam switch assembly of claim 7 wherein the slot formed in the arm of the cam switch rotates with the arm and the slot formed in the member are aligned when the member is moved into engagement with the surface.

* * * * *